United States Patent [19]

Mahaffey, Jr.

[11] 4,371,645
[45] Feb. 1, 1983

[54] POLYOLEFIN PLASTIC COMPOSITIONS COMPRISING META- OR PAPA-DERIVATIVES (CHORO- OR BROMO-) OF DI-BENZYUIDENE SORBITOL

[75] Inventor: Robert L. Mahaffey, Jr., Inman, S.C.

[73] Assignee: Milliken Research Corporation, Spartanburg, S.C.

[21] Appl. No.: 288,082

[22] Filed: Jul. 29, 1981

Related U.S. Application Data

[63] Continuation of Ser. No. 143,258, Apr. 24, 1980, abandoned.

[51] Int. Cl.³ .................... C08L 23/02; C08L 23/04; C08L 23/18; C08K 5/06
[52] U.S. Cl. ........................................ 524/108; 524/58
[58] Field of Search .................................. 524/58, 108

[56] References Cited

U.S. PATENT DOCUMENTS

| | | | |
|---|---|---|---|
| 3,721,682 | 3/1973 | Murai et al. | 260/340.7 |
| 3,880,794 | 4/1975 | Iida et al. | 260/17.4 SG |
| 4,016,118 | 4/1977 | Hamada et al. | 524/108 |
| 4,294,747 | 10/1981 | Su | 524/108 |

FOREIGN PATENT DOCUMENTS

| | | | |
|---|---|---|---|
| 52-152442 | 12/1977 | Japan . | |
| 52-152443 | 12/1977 | Japan . | |
| 53-117044 | 10/1978 | Japan | 524/108 |
| 53-132049 | 11/1978 | Japan | 524/108 |
| 1291819 | 10/1972 | United Kingdom . | |

OTHER PUBLICATIONS

Derwent Abs. 28446 B/15, (Mar. 1979), New Japan Chem., (J54028348).
Derwent Abst. 00705 B/01, (Nov. 1978), Showa, (J63132049).
Derwent Abst. 83081 A/46, (Oct. 1978), New Japan Chem., (J53117044).

*Primary Examiner*—Paul Lieberman
*Assistant Examiner*—Herbert J. Lilling
*Attorney, Agent, or Firm*—H. William Petry; Terry T. Moyer

[57] ABSTRACT

A polyolefin plastic composition having improved transparency is provided which comprises a polymer selected from aliphatic polyolefins and copolymers containing at least one aliphatic olefin and one or more ethylenically unsaturated aliphatic comonomers, and a di-acetal of sorbitol in an amount sufficient to improve transparency; said di-acetal of sorbitol having the structure:

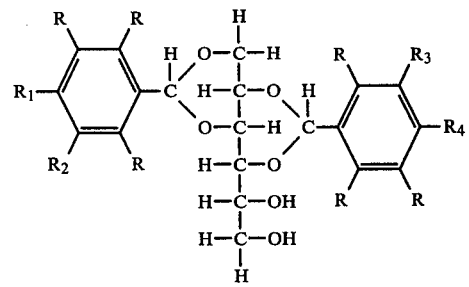

wherein R, $R_1$, $R_2$, $R_3$ and $R_4$ are selected from hydrogen, lower alkyl, hydroxy, methoxy, mono- and di-alkylamino, nitro and halogen, with the proviso that at least one of $R_1$, $R_2$, $R_3$ and $R_4$ is chlorine or bromine.

9 Claims, No Drawings

POLYOLEFIN PLASTIC COMPOSITIONS COMPRISING META- OR PAPA-DERIVATIVES (CHORO- OR BROMO-) OF DI-BENZYUIDENE SORBITOL

This is a continuation of pending application Ser. No. 143,258, filed Apr. 24, 1980, now abandoned.

This invention relates to a polyolefin plastic composition having improved transparency characteristics.

Polyolefins, for example, polyethylene or polypropylene have found a wide range of applications as packaging materials and containers in the form of films, sheets, or hollow articles, but because of their poor transparency, their use has been limited. In particular, they are unsuitable as packaging materials or containers for such articles as are desired to be visible through them (e.g., cosmetics or foodstuffs).

Attempts have been made to improve the transparency of polyolefins by incorporating certain kinds of additives in them. For instance, para-t-butylbenzoic acid, its salts, low molecular weight waxy polyethylene, and low molecular weight waxy polypropylene have been suggested as such additives. These conventional additives, however, are unable to bring about a sufficient improvement of the transparency because they deteriorate the mechanical and chemical properties of the products, or have poor miscibility with the polyolefins.

More recently, as described in U.S. Pat. No. 4,016,118 to Hamada et al., a polyolefin plastic composition having improved transparency and reduced molding shrinkage characteristics has been proposed which contains the compound dibenzylidene sorbitol. While this additive has been shown to be superior to those previously known for improving the transparency characteristics of polyolefin plastic compositions, it would be desirable to even further improve the transparency of such polyolefins without adversely affecting the mechanical and chemical properties of the final products. Accordingly, the present invention provides an additive which may improve the transparency of polyolefins even as compared to the previously known product dibenzylidene sorbitol which may not deteriorate the mechanical and chemical properties of the final products.

According to the present invention, a polyolefin plastic composition having improved transparency is provided which comprises a polymer selected from aliphatic polyolefins and copolymers containing at least one aliphatic olefin and one or more ethylenically unsaturated comonomers and at least one di-acetal of sorbitol, said di-acetal of sorbital having the structure:

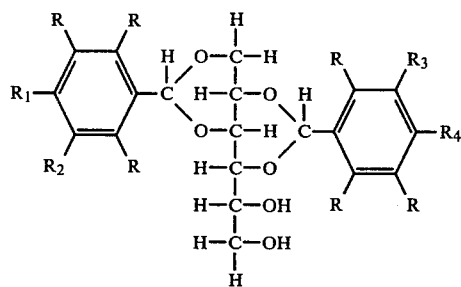

wherein $R$, $R_1$, $R_2$, $R_3$ and $R_4$ are selected from hydrogen, lower alkyl, hydroxy, methoxy, mono- and di-alkylamino, amino, nitro and halogen, with the proviso that at least one of $R_1$, $R_2$, $R_3$ and $R_4$ is chlorine or bromine.

It should be appreciated with regard to the structural formula set forth above that while only the 1,3:2,4 isomer is represented, this structure is provided for convenience only and the invention is not limited to only isomers of the 1,3:2,4 type, but may include any and all other isomers as well so long as the compound contains two aldehyde substituents on the sorbitol moiety.

The di-acetal of the present invention may be a condensation product of sorbitol and benzaldehyde or a substituted benzaldehyde. At least one of the benzaldehyde or substituted benzaldehyde moieties is substituted in either or both of the meta and para positions with a halogen atom selected from chlorine and bromine. Substituents which may be employed on the substituted benzaldehyde moiety in any of the ortho, meta and para positions include, for instance, in addition to chlorine and bromine, which must be provided in either or both of the meta and para positions on at least one of the aldehyde substituents, lower alkyl, e.g., having from 1 to about 5 carbon atoms, hydroxy, methoxy, mono- and di-alkylamino, amino and halogen other than chlorine and bromine. Preferred di-acetals of the present invention include di-p-chlorobenzylidene sorbital; di-m-chlorobenzylidene sorbitol; O-benzylidene-O-p-chlorobenzylidene sorbitol, di-m-bromobenzylidene sorbitol, and bis(3,4-dichlorobenzylidene) sorbitol.

The di-acetals of the present invention may be conveniently prepared by a variety of techniques, some of which are known in the art. Generally, such procedures employ the reaction of one mole of D-sorbitol with about two moles of aldehyde in the presence of an acid catalyst. The temperature employed in the reaction will vary widely depending upon the characteristics, such as melting point, of the aldehyde or aldehydes employed as a starting material in the reaction. The reaction medium may be an aqueous medium or a non-aqueous medium. One very advantageous method which can be employed to prepare the di-acetals of the invention is described in U.S. Pat. No. 3,721,682, to Murai et al. (New Japan Chemical Company Limited), the disclosure of which is hereby incorporated herein by reference. While the disclosure of the patent is limited to benzylidene sorbitols, it has been found that the di-acetals of the present invention may also be conveniently prepared by the method described therein.

The di-acetals of sorbitol of the present invention prepared by the above techniques may contain a minor or even a major portion of by-product mono-acetal and tri-acetal as impurities. Although it may not always be necessary to remove these impurities prior to incorporation of the di-acetal into the polyolefin, it may be desirable to do so and such purification may serve to enhance the transparency of the resin produced thereby. Purification of the di-acetal may be accomplished, for instance, by removal of tri-acetal impurities by the extraction thereof with a relatively non-polar solvent. By removal of the impurities, the product may be purified so that the amount of di-acetal in the additive composition contains at least about 90 percent and even up to about 95 percent di-acetal or more.

The proportion of di-acetal in the composition of this invention is an amount sufficient to improve the transparency of the composition, generally from about 0.01 to about 2 percent by weight, preferably about 0.1 to about 1 percent by weight, based upon the total weight of the composition may be provided. When the content of di-acetal is less than about 0.01 percent by weight, the resulting composition may not be sufficiently improved in respect to transparency characteristics. When the content of di-acetal is increased beyond about 2 percent by weight, no additional advantage can be observed.

The polyolefin polymers of the present invention may include aliphatic polyolefins and copolymers containing at least one aliphatic olefin and one or more ethylenically unsaturated comonomers. Generally the comonomer if present will be provided in a minor amount, e.g., about 10 percent or less or even about 5 percent or less, based upon the weight of the polyolefin. Such comonomers may serve to assist in clarity improvement of the polyolefin, or they may function to improve other properties of the polymer. Examples include acrylic acid and vinyl acetate, etc. Examples of olefin polymers whose transparency can be improved conveniently according to the present invention are polymers and copolymers of aliphatic monoolefins containing 2 to about 6 carbon atoms which have an average molecular weight of from about 10,000 to about 500,000, preferably from about 30,000 to about 300,000, such as polyethylene, polypropylene, crystalline ethylenepropylene copolymer, poly(1-butene), and polymethylpentene. The polyolefins of the present invention may be described as basically linear, regular polymers which may optionally contain side chains such as are found, for instance, in conventional, low density polyethylene.

The olefin polymer or copolymer used in the composition of the present invention is crystalline, and the diffraction of light caused by micro crystals contained in it is considered to be responsive for the deterioration of the transparency of the polymer. It is thought that the di-acetal functions in the composition to reduce the size of the microcrystals thereby improving the transparency of the polymer.

The composition of the present invention can be obtained by adding a specific amount of the di-acetal directly to the olefin polymer or copolymer, and merely mixing them by any suitable means. Alternatively, a concentrate containing as much as about 10 percent by weight of the di-acetal in a polyolefin masterbatch may be prepared and be subsequently mixed with the resin.

Other additives such as a transparent coloring agent or plasticizers (e.g., dioctyl phthalate, dibutyl phthalate, dioctyl sebacate, or dioctyl adipate), can be added to the composition of the present invention so long as they do not adversely affect the improvement of transparency of the product. It has been found that plasticizers such as those exemplified above may in fact aid in the improvement of the transparency by the di-acetal.

With regard to other additives it may also be desirable to employ the di-acetals disclosed above in combination with other conventional additives having known transparency improving effects such as, for instance, para-t-butylbenzoic acid, its salts, low molecular weight waxy polypropylene and the like. It may even be desirable to provide the particular di-acetals of the present invention in the polyolefin composition in combination with the previously described dibenzylidene sorbitol additive disclosed in U.S. Pat. No. 4,016,118. In such applications, generally at least about 10 percent, preferably about 25 percent, or even about 50 percent or more of the clarity improving component will be the di-acetals of the present invention, with the remainder being comprised of other known clarifying agents, plasticizers, etc.

The composition of the present invention is suitable as a packing material and container material for cosmetics and foodstuffs because it gives films, sheets or hollow articles having improved transparency characteristics and superior mechanical and chemical properties.

The following examples further illustrate the present invention. All parts and percents given in these examples are by weight unless otherwise indicated.

EXAMPLE 1

Preparation of Di-p-chlorobenzylidene Sorbitol (I)

In a one liter round bottom flask equipped with overhead stirrer, nitrogen gas inlet, Dean-Stark trap, and condenser were placed 65.0 grams (0.25 mole) of 70 percent aqueous sorbitol, 70.3 grams (0.50 mole) of p-chlorobenzaldehyde, 15 milliliters of dimethylsulfoxide, 2.0 milliliters of 70 percent methanesulfonic acid, and 500 milliliters of cyclohexane. The mixture was stirred vigorously under a nitrogen atmosphere and heated to reflux. When the theoretical amount of water had distilled from the mixture the reaction was halted. During the reflux period a thick, white precipitate of the product formed. The precipitate was neutralized with triethylamine, filtered, washed thoroughly with water, and dried to give 66.2 grams of product as a white powder. The product was purified by suspending it in dioxane (10 percent w/v) and stirring the resulting mixture at 50° C. for 1 hour. The mixture was filtered, and the solid obtained was washed with additional dioxane and dried. The product had a melting point of 244°–47° C. and was approximately 95 percent pure by high pressure liquid chromatography.

EXAMPLE 2

Preparation of O-benzylidene-O-p-chlorobenzylidene Sorbitol (II)

O-benzylidene-O-p-chlorobenzylidene sorbitol (II) was prepared by the method of Example 1 using equimolar amounts of benzaldehyde and p-chlorobenzaldehyde. It was isolated as a mixture with dibenzylidene sorbitol (DBS) and di-p-chlorobenzylidene sorbitol (DCBS) as shown by high pressure liquid chromatography. The approximate ratio of DBS:II:DCBS was 1:3.8:2. The mixture melted at 207°–214° C.

EXAMPLE 3

Preparation of Mixture of Dibenzylidene Sorbitol and Di-p-chlorobenzylidene Sorbitol A 50 percent mixture was prepared by mixing equal weights of commercially available dibenzylidene sorbitol and di-p-chlorobenzylidene sorbitol prepared by the method of Example 1.

EXAMPLES 4 AND 5

Di-m-tolylidene sorbitol (Example 4) and di-p-tolylidene sorbitol (Example 5) disclosed in Japanese Patent No. SHO NO. 53 [1978]—117044 to Kobayashi et al., (New Japan Chemical Co., Ltd.) were prepared from aqueous sorbitol and m-tolualdehyde and p-tolualdehyde respectively according to the method of Example 1. The respective melting points were 216°–219° C. and 247°–248° C.

EXAMPLE 6

Di-m-bromobenzylidene sorbitol was prepared from aqueous sorbitol and m-bromobenzaldehyde according to the method of Example 1. The product had a melting point of 247°–250° C.

EXAMPLE 7

Bis(3,4-dichlorobenzylidene)sorbitol was prepared from aqueous sorbitol and 3,4-dichlorobenzaldehyde according to the method of Example 1. The melting point of the product was 270° C.

EXAMPLE 8

Di-o-chlorobenzylidene sorbitol was prepared and purified by the method of Example 1 yielding a white solid with a melting point of 220°–222° C. Incorporation of this material into polypropylene at 0.5 percent gave a haze value of 50.

EXAMPLE 9

Di-p-methoxybenzylidene sorbitol was prepared and purified by the method of Example 1 yielding a white solid with a melting point of 185°–187° C. Incorporation of this material into polypropylene at 0.5 percent gave a haze value of 52.

EXAMPLE 10

Di-p-fluorobenzylidene sorbitol was prepared and purified by the method of Example 1 yielding a white solid of melting point 214°–218° C. Incorporation of this material into polypropylene at 0.25 percent gave a haze value of 17.

EXAMPLE 11

Additives prepared pursuant to the preceding examples were incorporated into polypropylene by first preparing a concentrate containing the desired proportion of additive (either 3.75 grams for a 0.25 percent concentration or 7.50 for a 0.5 percent concentration) in 150 grams of a commercially available polypropylene and mixing in a laboratory blender. Then additional amounts of polypropylene powder (1350 grams) was added to the concentrate, with stirring at approximately 700 rpm in a Welex mixer, until the desired concentration of additive was achieved, e.g., either 0.25 percent or 0.5 percent as indicated in the Table. The mixture was then extruded at 465° F., pelletized and molded into thin plaques of about 50 mils at 480° F.

The haze and clarity values were measured by ASTM Standard Test Method D1003-61 "Haze and luminous transmittance of transparent plastics."

TABLE

| Example No. | Additive | Concentration (%) | Haze (%) | Clarity (%) |
|---|---|---|---|---|
| | none | | 72 | |
| | dibenzylidene sorbitol | 0.25 | 16 | 73 |
| 1 | di-p-chlorobenzylidene sorbitol | 0.25 | 10 | 79 |
| | | 0.38 | 9 | |
| | | 0.50 | 8 | |
| | | 0.75 | 9 | |
| | | 1.00 | 10 | |
| 2 | O—benzylidene-O—p-chlorobenzylidene sorbitol | 0.25 | 11 | 77 |
| 3 | mixture of dibenzylidene sorbitol and di-p-chlorobenzylidene sorbitol | 0.25 | 12 | |
| 4 | di-m-tolylidene sorbitol | 0.25 | 12 | 76 |
| 5 | di-p-tolylidene sorbitol | 0.25 | 13 | 76 |
| 6 | di-m-bromobenzylidene sorbitol | 0.50 | 11 | |
| 7 | bis(3,4-dichlorobenzylidene) sorbitol | 0.50 | 8 | |
| 8 | di-o-chlorobenzylidene sorbitol | 0.50 | 50 | |
| 9 | di-p-methoxybenzylidene sorbitol | 0.50 | 52 | |
| 10 | di-p-fluorobenzylidene sorbitol | 0.25 | 17 | |

As the Table illustrates, compounds which are substituted in either or both of the meta and para positions with either chlorine or bromine atoms show a significant reduction in the haze or increase in clarity in the polypropylene samples beyond that provided by any prior clarifying agent including dibenzylidene sorbitol which is presently available commercially, and even di-m-tolylidene sorbitol and di-p-tolylidene sorbitol disclosed in the Japanese patent referred to above in Example 4. The mixed acetal of Example 2, furthermore, shows an unexpected reduction in haze over what would be anticipated from a compound containing one benzylidene moiety and one p-chlorobenzylidene moiety. A priori it would be expected that compound of Example 2 would show a haze value intermediate between dibenzylidene sorbitol and di-p-chlorobenzylidene sorbitol. However, the compound shows a haze value much closer to that of di-p-chlorobenzylidene sorbitol. Likewise, the mixture of Example 3 shows a reduction of haze out of proportion to the concentration of the two components. Thus, at a composition of 50 percent dibenzylidene sorbitol and 50 percent di-p-chlorobenzylidene sorbitol the anticipated haze value would be half way between that of the two pure components. Instead, the mixture gives a reduction greater than that expected.

What is claimed is:

1. A polyolefin plastic composition having improved transparency, which comprises a polymer selected from aliphatic polyolefins and copolymers containing at least one aliphatic olefin and one or more ethylenically unsaturated aliphatic comonomers and at least one di-acetal of sorbitol; said di-acetal of sorbitol having the structure:

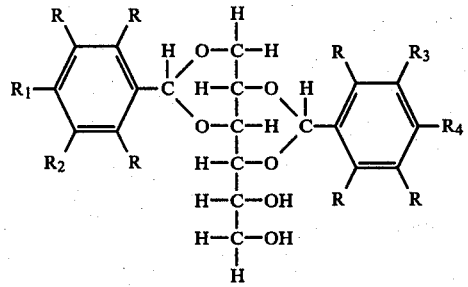

wherein $R$, $R_1$, $R_2$, $R_3$ and $R_4$ are selected from hydrogen, lower alkyl, hydroxy, methoxy, mono- and di-alkylamino, amino, nitro and halogen, with the proviso that at least one of $R_1$, $R_2$, $R_3$ and $R_4$ is chlorine or bromine.

2. The composition of claim 1, wherein said di-acetal is selected from di-p-chlorobenzylidene sorbitol; di-m-chlorobenzylidene sorbitol; O-benzylidene-O-p-chlorobenzylidene sorbitol; di-m-bromobenzylidene sorbitol and bis(3,4-dichlorobenzylidene) sorbitol.

3. The composition of claim 1, wherein said aliphatic monoolefin is selected from the group consisting of ethylene, propylene, copolymers of ethylene and propylene, and 1-butene.

4. The composition of claim 1, wherein said di-acetal is provided in said polymer in substantially pure form.

5. The composition of claim 1, wherein said di-acetal is provided in the form of an admixture with dibenzylidene sorbitol.

6. The composition of claim 1, which further includes at least one plasticizer selected from the group consisting of dioctyl phthalate, dibutyl phthalate, dioctyl sebacate, and dioctyl adipate.

7. A polyolefin plastic composition having improved transparency, which comprises at least 1 homopolymer of an aliphatic monoolefin or a copolymer containing an aliphatic monoolefin, said monoolefin containing from 2 to about 6 carbon atoms having an average molecular weight of from about 10,000 to about 500,000 and one or more ethylenically unsaturated aliphatic comonomers, said copolymer having been made by polymerizing said monoolefin with said comonomer; and at least on di-acetal of sorbitol selected from di-p-chlorobenzylidene sorbitol; di-m-chlorobenzylidene sorbitol; O-benzylidene-O-p-chlorobenzylidene sorbitol; di-m-bromobenzylidene sorbitol; and bis(3,4-dichlorobenzylidene) sorbitol; the proportion of the di-acetal being from about 0.01 to about 2 percent by weight based upon the total weight of the composition.

8. The composition of claim 7, wherein the aliphatic monoolefin is selected from the group consisting of ethylene, propylene, 1-butene and methylpentene.

9. The composition of claim 8, wherein said di-acetal is di-p-chlorobenzylidene sorbitol.

* * * * *

UNITED STATES PATENT AND TRADEMARK OFFICE
CERTIFICATE OF CORRECTION

PATENT NO. : 4,371,645

DATED : February 1, 1983

INVENTOR(S) : Robert L. Mahaffey, Jr.

It is certified that error appears in the above-identified patent and that said Letters Patent is hereby corrected as shown below:

On the title page, Item [54] and column 1, lines 2-5:
Change title from "POLYOLEFIN PLASTIC COMPOSITIONS COMPRISING META- OR PAPA- DERIVATIVES (CHORO- OR BROMO-) OF DI-BENZYUIDENE SORBITOL" to --POLYOLEFIN PLASTIC COMPOSITIONS COMPRISING META- OR PARA-DERIVATIVES (CHLORO- OR BROMO-) OF DI-BENZYLIDENE SORBITOL--.

In the Abstract, third line below formula, after "alkylamino," insert --,amino,--.

Column 3, line 35, change "responsive" to --responsible--.

Column 8, line 9, change "on" to --one--.

Signed and Sealed this

Eighteenth Day of October 1983

[SEAL]

Attest:

GERALD J. MOSSINGHOFF

Attesting Officer

Commissioner of Patents and Trademarks